E. A. BLANTON, Jr.
NUT LOCK.
APPLICATION FILED MAR. 3, 1910.
987,106.
Patented Mar. 21, 1911.
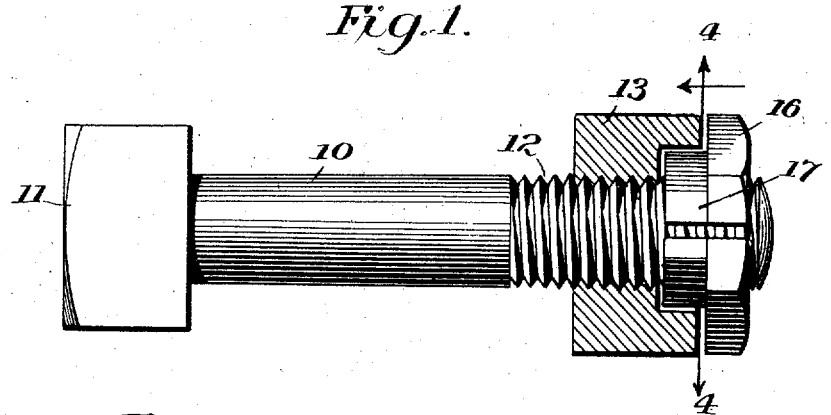
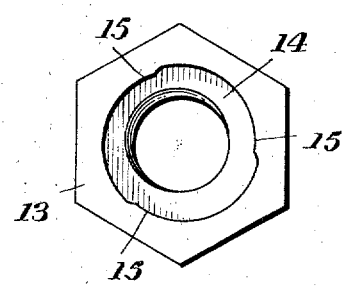
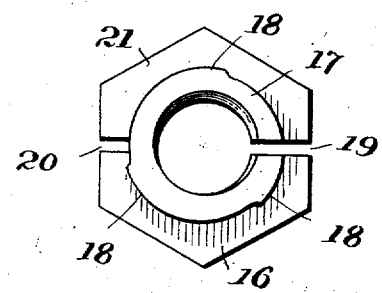
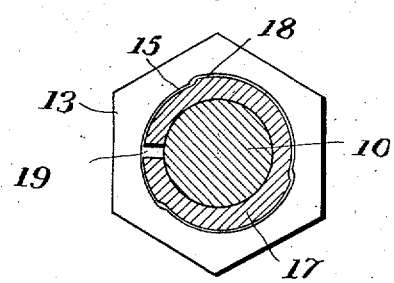
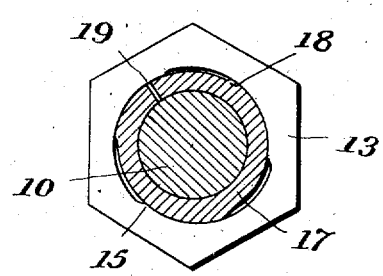
Witnesses
J. G. Hinkel
J. H. Bruninga
Inventor
Edward A. Blanton Jr.
By
Paster, Freeman, Watson & Coit
Attorneys

UNITED STATES PATENT OFFICE.

EDWARD A. BLANTON, JR., OF PHILADELPHIA, PENNSYLVANIA.

NUT-LOCK.

987,106. Specification of Letters Patent. Patented Mar. 21, 1911.

Application filed March 3, 1910. Serial No. 547,114.

*To all whom it may concern:*

Be it known that I, EDWARD A. BLANTON, Jr., a citizen of the United States, and resident of Philadelphia, county of Philadelphia, State of Pennsylvania, have invented certain new and useful Improvements in Nut-Locks, of which the following is a specification.

This invention relates to certain new and useful improvements in nut locks having for its object to provide a simple and exceedingly efficient lock which may be cheaply manufactured, quickly applied and one which will securely hold a bolt and nut against relative movement.

This invention is an improvement on my prior Patent 644,159 granted February 27, 1900.

With this object in view, the invention consists in a novel construction and combination of parts hereinafter set forth with more particularity.

In the drawings, Figure 1 is an elevation of a bolt with a nut applied thereto, parts being shown in section; Fig. 2 is a detail view of the nut; Fig. 3 is a detail view of the locking piece; Fig. 4 is a section on the line 4—4, Fig. 1, looking in the direction of the arrow and showing the locking piece in unlocking position; Fig. 5 is a similar view showing the locking piece in locking position.

Referring to the drawings, 10 designates a bolt of ordinary construction provided with a head 11 and having cut thereon threads 12. A nut 13 is provided with threads adapted to engage the threads 12 of the bolt. This nut is provided with a recess 14 having formed on its interior surface a number of cams 15. The locking piece 16 is provided with a cylindrical portion 17 having formed thereon cams 18 adapted to coöperate with the cams 15 in the nut 13. The locking piece is provided with a slot cut clean through the same and one or more grooves 20, the construction being such that the locking piece may be contracted. The locking piece is provided with an angular head which has the same number of sides as the nut 13. In this instance both the nut and the head 21 are shown as hexagonal in form.

The nut 13 is of sufficient depth so that the threads thereon will be strong enough to take up all the necessary strain. The locking piece remains separated from the nut at all times, as shown in Fig. 1, the purpose being to throw all strain off the locking piece 16. The cams and the threads on and in the nut and locking piece are so relatively located and cut that the locking piece may be contracted to clamp the bolt 10, by rotating the same, as will herein appear, without jamming the members together endwise. The purpose of this construction is to throw all strain off of the locking piece 16 and throw it entirely on the nut 13, and also to prevent a frictional engagement between the axial engaging faces of the nut and locking piece, for the purpose hereinafter to be described.

The operation of this device may be briefly summarized as follows: The bolt is inserted through the parts which are to be clamped together. The nut and locking piece are placed in the position shown in Fig. 4 in which there will be a slight play between the parts and screwed upon the bolt 10. After the nut 13 is brought up tightly against the face of one of the parts which are to be secured together, the wrench is placed upon the head 21 of the locking piece and the locking piece is rotated until the cams 15 and 18 cause the locking piece to grip the bolt and nut. The amount of rotation which must be given to the locking piece will depend upon the variation in the threads on the bolt and locking piece. The play between the threads and the construction of the cams may be such that the locking piece when gripped is placed in position so that the angular faces of the locking piece and nut again coincide. This is shown in Figs. 4 and 5 where the nut is rotated through 60°, the nut being of hexagonal shape. This invention is, however, not limited to this particular construction, as the movement of the locking piece necessary to grip the bolt and nut will ordinarily vary with the play between the threads. Furthermore the locking piece or nut, or both, may be cylindrical in shape. After the locking piece has been clamped on the bolt and nut the nut will be securely locked in place and any tendency for the nut to rotate will be resisted by the locking piece 16 and will clamp the locking piece more firmly on the bolt. It will thus be seen that the nut is securely locked in position and any tendency to loosen the nut caused by vibration and other causes will cause a more firm locking engagement.

It will be seen that the locking piece when tightened up will be slightly separated from the nut, so as to prevent axial frictional engagement between the adjacent faces of the nut and locking piece. It is very important to prevent all frictional engagement except between the coöperating cams for the following reasons: If the locking piece and bolt were jammed up together so that there would be a frictional engagement between them, then since the threads of both the nut and locking piece are necessarily continuous and in the same direction, if there would be a tendency to loosen the nut, the locking piece would tend to rotate with it, due to the axial frictional engagement, thereby practically destroying the effectiveness of the locking feature. If, however, they remain slightly separated then the frictional engagement between the nut and the locking piece is entirely between the coöperating cam faces and if there is a tendency for the nut to loosen, then since the locking piece has already a grip on the threads of the bolt, this unloosening of the nut will have a tendency to clamp the locking piece still tighter on the bolt, thereby resisting any rotation of the locking piece with the nut.

It will be noted in this particular instance that the cams are three in number while the nut and the locking piece are hexagonal in form. Generally stated, the number of cams will be a divisor of the number of sides of the lock nut. The purpose of this arrangement is to cause the locking piece when unlocked and in some constructions when locked to be located with the faces in alinement. If in this case the number of cams were equal to the number of faces of the lock nut, then a movement of the locking piece through 60° to bring the faces into alinement would cause the locking piece to remain unlocked. When, however, the number of cams is a divisor of the number of faces of the lock nut, a movement to bring the faces again into alinement will cause the parts to be locked. With this construction the faces on the nut and locking piece are in alinement when the locking piece is in both locked and unlocked position, thus facilitating the application of the same, and improving appearances and avoiding a multiple of projecting corners when locked. It will be obvious that this arrangement of cams and faces is not limited to a hexagonal nut but may be used for nuts having any number of faces, thus in a square nut the preferable number of cams will be two, in a hexagonal nut the number of cams will be two or three, while in an octagonal nut the number of cams will be two or four. It is further obvious that it is not necessary that the locking piece be provided with a head 21 since the head may be omitted and the locking piece may be cylindrical in form and wholly located within the recess 14. In this case the locking piece which will then consist merely of the cylindrical portion 17 will be provided with the usual holes which are adapted to be engaged by a wrench.

It is obvious that various changes may be made in the details of construction without departing from this invention and it is therefore to be understood that this invention is not to be limited to the specific construction shown and described.

Having described my invention what I claim and desire to secure by Letters-Patent is, 1. A lock nut including a threaded nut and a contractile threaded locking piece, coöperating cams on said members adapted to close the locking piece when the members are rotated relatively to each other the nut and locking piece being slightly separated axially, and the cams and threads on both members being so relatively located and cut that the locking piece may be contracted without jamming the members together endwise.

2. A lock nut including a threaded nut having a recess therein provided with cams and a contractible threaded locking piece located in the recess and provided with cams coöperating with the cams in the recess to contract the locking piece when said members are rotated relatively to each other, the nut and locking piece being slightly separated axially, and the cams and threads on both members being so relatively located and cut that the locking piece may be contracted without jamming the members together endwise.

3. An angular lock nut including a threaded nut having a recess therein provided with cams and a contractible threaded locking piece located in the recess and provided with cams coöperating with the cams in the recess to contract the locking piece when said members are rotated relatively to each other, the nut and locking piece being slightly separated axially, and the cams and threads on both members being so relatively located and cut that the locking piece may be contracted without jamming the members together endwise, the number of cams being a divisor of the number of sides of the lock nut.

In testimony whereof I affix my signature in presence of two witnesses.

EDWARD A. BLANTON, JR.

Witnesses:
ALFRED R. JUSTICE,
M. MASTERS.